United States Patent [19]

Caracini et al.

[11] Patent Number: 4,684,006
[45] Date of Patent: Aug. 4, 1987

[54] FRICTION CLUTCH DRIVEN PLATE

[75] Inventors: Pietro Caracini, Passo Di Treia; Luigi Cucinotta, Castelbellino, both of Italy

[73] Assignee: Automotive Products plc, Warwickshire, England

[21] Appl. No.: 851,154

[22] Filed: Apr. 14, 1986

[30] Foreign Application Priority Data

Apr. 12, 1985 [IT] Italy ............................. 20317 A/85

[51] Int. Cl.⁴ ............................................. F16D 3/66
[52] U.S. Cl. .............................. 192/106.2; 192/107 R; 464/68
[58] Field of Search ............... 192/106.1, 106.2, 70.16, 192/70.17, 70.18, 107 R, 107 C, 70.11, 70.13; 464/68.98

[56] References Cited

U.S. PATENT DOCUMENTS

| | | | |
|---|---|---|---|
| 1,261,683 | 4/1918 | Behn | 464/98 |
| 2,855,767 | 10/1958 | Ahlen | 464/98 |
| 3,807,534 | 4/1974 | Eldred | 192/107 R X |
| 4,470,494 | 9/1984 | Takeuchi | 192/106.1 X |
| 4,496,036 | 1/1985 | Loizeau | 192/106.2 |
| 4,537,297 | 8/1985 | Davies | 192/106.2 |
| 4,549,641 | 10/1985 | Ootani et al. | 192/106.1 X |
| 4,557,702 | 12/1985 | Takeuchi | 464/68 |
| 4,569,668 | 2/1986 | Fukushima | 192/106.2 X |
| 4,588,062 | 5/1986 | Caray et al. | 192/106.2 |
| 4,592,459 | 6/1986 | Weissenberger et al. | 192/106.2 |
| 4,596,535 | 6/1986 | Ooga | 464/68 |
| 4,618,048 | 10/1986 | Kobayashi | 464/68 X |

FOREIGN PATENT DOCUMENTS 2808058 8/1978 Fed. Rep. of Germany ... 192/106.2
706260 3/1954 United Kingdom ............. 192/106.2

Primary Examiner—William F. Pate, III
Assistant Examiner—Creighton Smith
Attorney, Agent, or Firm—Solon B. Kemon

[57] ABSTRACT

A friction clutch driven plate comprises first and second disk-like carrier plates rivetted together and having first and second flat spokes respectively on their peripheries. A single integral annulus of friction material is held in place by the first spokes in a first recess in a first face of the annulus and by the second spokes in second recesses in an opposite second face of the annulus. The carrier plates are also connected together by stop rivets passing through arcute slots in a third disc between the carrier plates. In known fashion torsional vibration damping springs are disposed in windows in the carrier plates and the third disc. The third disc has a central hole lined by splines to engage similar splines on a shaft. First and second bearing bushes are disposed in the central openings of the carrier plates. These bushes have internal diameters substantially equal to that of the root circle of the splines on the third disc so that the bushes will sit on the tips of the splines on said shaft whereby the bushes and third disc are supported substantially co-axially.

16 Claims, 4 Drawing Figures

FRICTION CLUTCH DRIVEN PLATE

This invention relates to friction clutch driven plates, particularly though not exclusively, for clutches of motor vehicles.

In use in a clutch the driven plate may be releasably clampable between a flywheel or driven plate and a pressure plate under the action of spring means, for example a diaphragm spring.

According to a first aspect of the invention there is provided a friction clutch driven plate comprising carrier plate means supporting annularly disposed friction material providing oppositely facing friction faces, the carrier plate means being rotatable about a central axis, said carrier plate means having at its circumference outwardly extending spokes, at least one of the faces being formed with recesses therein, and each spoke being disposed in a respective recess in a said face which is proud of the spoke.

The spokes can be disposed in each of the friction faces.

The friction material can be in the form of an integral annulus.

Each recess may extend across the radial width of the annularly disposed friction material.

A first plurality of said spokes can be disposed in recesses in a first said friction face and a second plurality of said spokes can be disposed in recesses in a second said friction face facing oppositely to the first face. The spokes of the first plurality are at the circumference of a first carrier plate, and the spokes of the second plurality are at the circumference of a second carrier plate attached to the first carrier plate.

Preferably each spoke is substantially planar and lies in a plane transversely to the said axis.

Driven plates having annular friction facings adhered directly to both sides of a metal carrier plate are known having no cushioning between the facings but this lack of cushioning gives rise to heat spotting caused by rubbing of the driven plate friction faces over high spots on the pressure plate and driving plate. Heat spotting can cause rapid breakdown of the friction material. To mitigate this drawback British Patent No. 2044864 discloses a friction clutch driving plate having two co-axial annular friction facings each moulded directly onto its own respective carrier plate, the two carrier plates being arranged back-to-back to present the friction faces of the facings in axially opposite directions, and being joined so that the backs of the carrier plates are resiliently spaced apart allowing the friction faces to flex on contact with a driving member surface when applied to the faces under an axial load. This is a relatively complex construction.

To reduce the chance of heat spotting an embodiment in accordance with the first aspect of the invention can be advantageously formed in which the annularly disposed friction material can flex between the spokes, and also the spokes can flex axially. This permits axial deflections or deformations of the friction material and, as will be understood from the description below with reference to the accompanying drawings, the embodiment can be of simple construction.

According to the second aspect of the invention there is provided a friction clutch driven plate comprising annularly disposed friction material for rotation about a central axis and providing oppositely facing friction faces, carrier means supporting said friction material and being arranged for rotation about said axis in response to input torque transmitted to the carrier means from the friction material when the clutch plate is in use, a disc with a central aperture having an aperture wall formed by splines arrayed in a circle co-axial with said axis, said splines being intended to engage with splines of a torque output shaft when the clutch plate is in use and fitted thereon, the disc and carrier means being connected to enable torque from the carrier means to be transmitted to the disc, resilient damping means being provided between said carrier means and said disc to allow relative arcuate movement between them about said axis, a bearing ring adjacent to a side of the disc and intended to fit over the splines of the output shaft, said bearing ring having an internal diameter substantially equal to the root circle of the splines on the disc, said carrier means having a central aperture and said bearing ring being disposed in said central aperture in said carrier means.

An embodiment may be formed in accordance with the second aspect of the invention which obviates the need for a conventional hub for the driven plate in which such conventional hub there is an internally splined metal tube fast with an external disc disposed intermediate the ends of the tube and acted on by resilient damping means between the disc and annular carrier plates which are concentric with the tube and sit on its exterior to either side of the disc and bear the friction material. The avoidance of a conventional hub can enable an embodiment of a clutch driven plate to be formed in accordance with the second aspect which may be relatively light in weight and has a potential for being formed more cheaply. One reason being that the previously known accurately machined tube type hub can be replaced at least in part by moulded plastics components.

Each aspect of the invention will now be further described, by way of example, with reference to the accompanying drawing in which.

Figure 1:
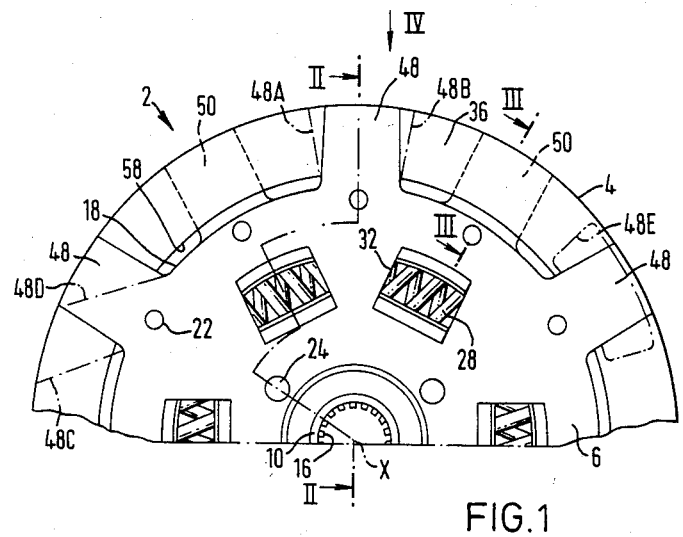
FIG. 1 is a diagrammatic plan view of approximately half of a friction clutch driven plate formed according to both aspects of the invention.
Figure 2:
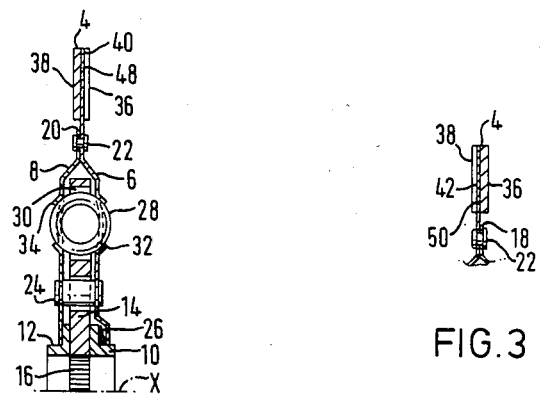
FIG. 2 is a section on line II—II of FIG. 1.
Figure 3:
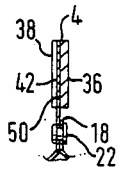
FIG. 3 is a section of line III—III of FIG. 1.

In the drawing there is shown at 2 a friction clutch driven plate for rotation about a central axis X. The clutch plate may be used, for example, in a diaphragm spring clutch for a motor vehicle.

The plate 2 is formed with an integral or one-piece annulus 4 of friction material supported on a carrier comprising two disc-liked dished, steel carrier plates 6 and 8 fitting at their central apertures on respective bearing bushes 10 and 12 which may be of tough plastics material and are disposed to either side of a rigid driven disc 14 having its central aperture lined by axial splines 16. Throughout, the disc 14 has substantially the same axial thickness. The radial, external annular flange of each bush 10 or 12 is interposed between the disc 14 and that portion of corresponding carrier plate 6 or 8 adjacent to the plate's central aperture, and the internal diameter of each bush is substantially equal to that of the root circle of the splines to the extent that when the driven plate is in use with the splines 16 engaging axial splines on an output transmission shaft (not shown) each bearing bush 10 or 12 is in sliding contact with the tips of the shaft splines. Thus, the shaft supports the bushes substantially co-axially one with the other and substantially co-axially with the central opening in the disc 14 and with the shaft.

Adjacent to their outer peripheries 18,20 the carrier plates 6 and 8 are made fast with each other by rivets 22. The carrier plates are also interconnected by known stop rivets 24 in respective arcuate slots in the disc 14, and the carrier 6,8 is axially pre-loaded by a Belleville washer 26. Known torsional vibration damping springs 28 are disposed in windows 30,32 and 34 in the disc 14 and carrier plates 6 and 8 respectively.

The opposite facing friction faces 36 and 38 of the annulus 4 are each formed with a plurality of respective substantially equi-angularly spaced recesses 40 or 42 therein, in the example there being six recesses 40 and six recesses 42. The recesses 40 are angularly staggered with respect to the recesses 42 and preferably each recess 40 is substantially midway between two adjacent recesses 42. Each recess extends substantially radially and across the whole radial width of the annulus 4, and has two opposite substantially parallel sides 44,46. At its circumference 18 the carrier plate 6 has a plurality of similar flat paddles or spokes 48 each integral with the carrier plate and radially extending and disposed in the corresponding recesses 40. Likewise, the carrier plate 8 is formed with paddles or spokes 50 disposed in the recesses 42. The width of each spoke in the circumferential direction is such that each spoke extends across the whole of the width of the corresponding recess in the circumferential direction. As shown, opposite sides 52 and 54 of each spoke may be axially turned-out, radiused flanges each in juxtaposition with the adjacent side 44 and 46 of the corresponding recess.

Figure 4:
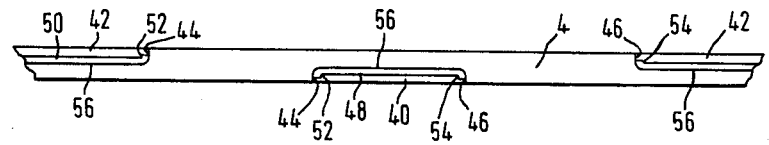
FIG. 4 is a fragment of a developed view, on enlarged scale, in the direction of arrow IV in FIG. 1 with parts absent.

Each spoke 48,50 is so disposed that the corresponding friction face 36 or 38 is proud thereof, also each flat spoke lies in a plane which is transverse (in the example at substantially 90°) to the axis X. Also in the example, and which is best seen in FIG. 4, faces 56 of the spokes adjacent to bases of the recess 40,42 all lie in substantially the same plane which is transverse (in the example at substantially 90°) to the axis X.

Because the carrier plates 6 and 8 are secured together the annulus 4 is retained between the spokes in the position substantially as shown. When the driven plate is in use and clamped against a driving plate, torque from that plate is transferred to the annulus 4 which pushes the spokes to rotate the carrier plates 6,8 and via the springs 28 driving torque is transmitted to the disc 14 which drives the aforesaid output shaft.

In the example the spokes 48 and 50 are of such length that their radial inner ends at the peripheries 18 and 20 of the carrier plates are radially inwardly of the inner periphery 58 of friction annulus 4, the peripheries 18,20 being spaced by an air gap from the periphery 58. This assists in the air cooling friction material 4 which cooling is further promoted by the recess 40 and 42 permitting air flow therethrough across the radial width of the annulus 4. Further grooves may be formed in the faces 36 and 38 to allow the passage of cooling air.

The friction material chosen for the annulus 4 can be of any kind known per se and be, for example, of a non-asbestos type. It can have some ability to deform or flex resiliently in the axial direction, for example between the spokes. This reduces the chance or effect of heat spotting when the driven plate is in use, also the spokes 48, 50 can be in the nature of leaf springs capable of some resilient flexing which also allows axial deformation or flexing of the friction annulus 4.

In a preferred embodiment each spoke 48 and 50 can have, as shown by the dot-dash line 48A, 48B, a width which in the circumferential direction increases progressively along the radially outwards direction so that the spoke is a dovetail-like fit in its corresponding recess in the annulus 4. If desired the sides 48A,48B can each be substantially radial.

In another embodiment each spoke 48,50 may be raked as indicated by dot-dash lines 48C,48D.

In yet another embodiment each spoke 48,50 may be formed with a radially outer head as indicated by dot-dash line 48E, which has substantially the shape of a sector of a circle, on a radially inner neck.

In a still further embodiment the spokes 48,50 may be adhesively bonded in the corresponding recesses 40,42 and/or the annulus 4 may be mechanically secured, for example, by rivets, to the spokes.

If desired the spokes may extend beyond the outer periphery of the annulus 4. Alternatively the spokes may stop short before reaching the outer periphery of the annulus 4 of friction material. In this latter case the recesses 40 and 42 may only extend partway across the radial width of the annulus 4, though they may be continued across by narrower grooves.

We claim:

1. A friction clutch driven plate comprising first and second carrier plates fast in rotation one with the other and being rotatable about a central axis, the first carrier plate having at its circumference outwardly extending spokes and the second carrier plate having at its circumference outwardly extending spokes, said spokes supporting annularly disposed friction material in the form of an intergral annulus providing first and second oppositely facing friction faces, each of said friction faces being formed with recesses therein, said spokes on said first carrier plate being disposed in aforesiad recesses in said first friction face and said spokes on said second carrier plate being disposed in aforesaid recesses in said second friction face, and each said spoke being disposed in a respective said recess in a said face which is prominent of the spoke.

2. A clutch plate according to claim 1, wherein each recess extends across the radial width of the annularly disposed friction material.

3. A clutch plate according to claim 1, wherein each said spoke is substantially planar and lies in a plane transversely to said axis.

4. A clutch plate according to claim 3 wherein with respect to said axis the spokes on said first carrier plate are angularly staggered relative to the spokes of said second carrier plate.

5. A clutch plate according to claim 4, wherein faces of said spokes adjacent to bases of said recesses all lie in substantially the same plane transverse to said axis.

6. A clutch plate according to claim 3, wherein said spokes of the first plurality are integral with the first carrier plate, and said spokes of the second plurality are integral with the second carrier plate.

7. A clutch plate according to claim 1, wherein said annularly disposed friction material is deformable axially.

8. A clutch plate according to claim 7, wherein said spokes can flex resiliently axially with respect to said axis.

9. A clutch plate according to claim 1, wherein said spokes on said carrier plate extend radially inwardly beyond an inner periphery of the annularly disposed friction material, and an outer peripheral portion of the said carrier plate extending between adjacent said spokes on said carrier plate is spaced radially inwardly from said inner periphery.

10. A clutch plate according to claim 1, wherein a side of each said spoke is in juxtaposition with a side of the said recess in which the spoke is disposed, and said side of the recess extends transversely to the direction of rotation of the clutch plate about the said axis.

11. A clutch plate according to claim 10, wherein opposite sides of each said spoke are each in juxtaposition with a respective opposite side of the recess in which said spoke is disposed, and along a generally radially outward direction there is a divergence of said opposite sides of the spoke and a divergence of said opposite sides of the recess.

12. A clutch plate according to claim 1, wherein at least one said spoke is bonded in a said recess.

13. A clutch plate according to claim 1, wherein at least one said spoke is mechanically secured to said friction material.

14. A friction clutch driven plate according to claim 1, wherein a disc is disposed between said first and second carrier plates, said disc being formed with a central aperture having an aperture wall formed by splines arrayed in a circle co-axial with said axis, said splines being intended to engage with splines of a torque output shaft when the clutch plate is in use and fitted thereon, said disc and said carrier plates being connected to enable torque from said carrier plates to be transmitted to said disc, resilient damping means being provided between said disc and said carrier plates to allow relative arcuate movement between said disc and said carrier plates about said axis, a pair of bearing rings each adjacent to an opposite side of said disc and intended to fit over the splines of the output shaft, each said bearing ring having an internal diameter substantially equal to the root circle of the splines aperture and a respective said bearing ring disposed in said central aperture in said carrier plate.

15. A clutch plate according to claim 14, wherein each said bearing ring is formed of plastics material.

16. A clutch plate according to claim 15 wherein each said bearing ring is a bush having a bush flange adjacent to said disc, and each said carrier plate is fitted on a said bush, and the bush flange is interposed between said disc and that portion of said carrier plate adjacent to said central aperture in said carrier plate.

* * * * *